(12) United States Patent
Uya et al.

(10) Patent No.: US 6,784,935 B1
(45) Date of Patent: Aug. 31, 2004

(54) IMAGE PICKUP APPARATUS CAPABLE OF WIDE DYNAMIC RANGE BY DOUBLE EXPOSURE, AND CONTROL THEREOF

(75) Inventors: Shinji Uya, Kurokawa-gun (JP); Tetsuo Yamada, Kurokawa-gun (JP)

(73) Assignees: Fuji Photo Film Co., Ltd., Kanagawa (JP); Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/432,114

(22) Filed: Nov. 2, 1999

(30) Foreign Application Priority Data

Apr. 11, 1998 (JP) .......................................... 10-313334

(51) Int. Cl.[7] .............................................. H04N 5/335
(52) U.S. Cl. ........................ 348/311; 348/296; 348/362
(58) Field of Search ................................ 348/311, 254, 348/296, 297, 362, 363, 364, 302, 229.1

(56) References Cited

U.S. PATENT DOCUMENTS

| | | | | |
|---|---|---|---|---|
| 5,420,635 A | * | 5/1995 | Konishi et al. | 348/362 |
| 5,517,242 A | * | 5/1996 | Yamada et al. | 348/254 |
| 5,694,167 A | * | 12/1997 | Hashimoto | 348/297 |
| 5,917,546 A | * | 6/1999 | Fukui | 348/296 |
| 6,204,881 B1 | * | 3/2001 | Ikeda et al. | 348/362 |
| 6,219,097 B1 | * | 4/2001 | Kamishima et al. | 348/297 |
| 6,369,853 B1 | * | 4/2002 | Merrill et al. | 348/302 |
| 6,480,226 B1 | * | 11/2002 | Takahashi et al. | 348/296 |
| 2001/0001245 A1 | * | 5/2001 | Kamishima et al. | 348/229.1 |

* cited by examiner

Primary Examiner—Aung Moe
(74) Attorney, Agent, or Firm—Arent Fox, PLLC

(57) ABSTRACT

An image pickup apparatus having: a plurality of photoelectric conversion elements each generating an electric signal through photoelectric conversion; a plurality of signal storage elements for storing the electric signals generated by the photoelectric conversion elements; a plurality of gates for reading the electric signals generated by the photoelectric conversion elements and storing the read electric signals in the signal storage elements; a controller for performing a first image pickup operation by making the photoelectric conversion elements generate the electric signals, reading the generated electric signals and storing the read electric signals in the signal storage elements, thereafter performing a second image pickup operation under an image pickup condition different from the first image pickup operation by making the photoelectric conversion elements generate the electric signals, thereafter outputting the electric signals generated by the first image pickup operation and stored in the signal storage elements to an external, and thereafter reading the electric signals generated by the second image pickup operation from the photoelectric conversion elements, storing the read electric signals in the signal storage elements, and outputting the electric signals to the external; and a synthesizing unit for generating an image signal by subjecting the output electric signals generated by the first and second image pickup operations to a white clip process and synthesizing the output electric signals.

20 Claims, 18 Drawing Sheets

IMAGE PICKUP APPARATUS CAPABLE OF WIDE DYNAMIC RANGE BY DOUBLE EXPOSURE, AND CONTROL THEREOF

This application is based on Japanese patent application No. HEI 10-313334, filed on Nov. 4, 1998, the entire contents of which are incorporated herein by reference.

BACKGROUND OF THE INVENTION a) Field of the Invention

The present invention relates to an image pickup apparatus and more particularly to an image pickup apparatus capable of picking up an image in a wide dynamic range and a method of controlling the image pickup apparatus.

b) Description of the Related Art

A solid state image pickup device has photodiodes disposed in a two-dimensional matrix shape and can take a two-dimensional image. Each photodiode corresponds to a pixel of an image.

FIG. 11 is a graph showing the photoelectric conversion characteristics of photodiodes of a solid state image pickup device. The abscissa represents the amount of light incident upon a photodiode, and the ordinate represents the voltage of a signal output from the photodiode. Characteristic curves A1, A2 and A3 show the photoelectric conversion characteristics of first, second and third photodiodes of the same solid state image pickup device.

Each of the characteristic curves A1 to A3 has a linear region R1 with a small incidence light amount and a saturated region R2 with a large incidence light amount. In the linear region R1, an output voltage is proportional to an incidence light amount. In the saturated region R1, the output voltage corresponding to incidence light is saturated.

The characteristics A1 to A3 of the photodiodes are the same in the linear region R1, whereas they are different in the saturated region R2. In the saturated region, the levels of output voltages of the photodiodes become irregular. In order to forcibly convert an output voltage of Vw or higher into a voltage Vw, a white clip process is performed.

If the white clip process is performed, the linear region R1 is only a region which can be used for photoelectric conversion. The dynamic range capable of photoelectric conversion is therefore determined basically by the width of the linear region R1.

Solid state image pickup devices are used with digital still cameras and video cameras. The dynamic range of a solid image pickup device is very narrow as compared to that of human eyes and a photographic film. A narrow dynamic range may cause white or black crushed areas in an image.

In order to avoid this, techniques are known by which an image is picked up two times at different exposure times and the two images are synthesized. The details of the techniques will be described with reference to FIGS. 12A to 12C.

Similar to FIG. 11, the abscissa of FIGS. 12A to 12C represents an incidence light amount and the ordinate represents an output voltage.

FIG. 12A is a graph showing the photoelectric conversion characteristics used by a first image pickup operation of long-time exposure. Since the exposure time is long, even if the incidence light amount per unit time is small, an output voltage is large. Therefore, the photoelectric conversion characteristics are subjected to the white clip process at a voltage Vw.

FIG. 12B is a graph showing the photoelectric conversion characteristics used by a second image pickup operation of short-time exposure. Since the exposure time is short, an output voltage for an incidence light amount per unit time is lower than that obtained by the characteristics (FIG. 12A) for the long-time exposure. The photoelectric conversion characteristics shown in FIG. 12B are also subjected to the white clip process.

FIG. 12C is a graph showing the photoelectric conversion characteristics obtained by synthesizing the first image pickup photoelectric conversion characteristics (FIG. 12A) and the second image pickup photoelectric conversion characteristics (FIG. 12B). For example, the synthesizing method is a simple addition of the two characteristics.

By using the synthesized photoelectric conversion characteristics, the dynamic range of the solid state image pickup device can be broadened. Therefore, irrespective of whether the incidence light amount is large or small, all photodiodes of a solid state image pickup device can have the uniform photoelectric conversion characteristics.

In the synthesized photoelectric conversion characteristics, a slope in the large incidence light amount region is gentler than that in the small incidence light amount region. The characteristics with different slopes are approximately equal to the human visual sense characteristics. Therefore, any practical problem will not occur even if the synthesized characteristics are used with a solid image pickup apparatus.

The first image pickup operation of long-time exposure and the second image pickup operation of short-time exposure may be performed in a reverse order.

Next, the operation of the solid image pickup device performing the above process will be described with reference to FIGS. 13 to 17. In FIGS. 13 to 17, a hatched area is an area where electric charges are stored.

FIG. 13 is a plan view of an all-pixel read type solid state image pickup device. Signals of all pixels (photodiodes) can be read to an external at the same time as one frame image.

The solid image pickup device has: photodiodes 51 disposed in a two-dimensional matrix shape for photoelectric conversion; vertical charge transfer paths (VCCD) 52 for transferring electric charges in a vertical direction; a horizontal charge transfer path (HCCD) 53 for transferring electric charges in a horizontal direction; and an output amplifier 54 for outputting a voltage corresponding to electric charges to an external.

First, as shown in FIG. 13, an image pickup operation of long-time exposure is performed to store electric charges of a first image in the photodiodes 51.

Next, as shown in FIG. 14, the electric charges of the first image stored in the photodiodes 51 are read and stored in the right side vertical charge transfer paths 52. After this data read, the first image pickup operation of long-time exposure is terminated, and an image pickup operation of short-time exposure starts for a second image.

Next, as shown in FIG. 15, the electric charges of the first image on the vertical charge transfer paths 52 are transferred downward to the horizontal charge transfer path 53. The horizontal charge transfer path 53 transfers the received electric charges from the right side to the left side to the output amplifier 54. The output amplifier 54 outputs a voltage corresponding to the received electric charges. Namely, it outputs a signal of the first image.

During this period, as shown in FIG. 16, electric charges for the second image are being stored in the photodiodes 51 by the second image pickup operation of short-time exposure which started immediately after the data read operation shown in FIG. 14.

Next, as shown in FIG. 17, the electric charges of the second image stored in the photodiodes 51 are read and stored in the right side vertical charge transfer paths 52. After this data read, the second image pickup operation of short-time exposure is terminated.

Next, similar to FIG. 15, the electric charges of the second image in the vertical charge transfer paths 52 are transferred downward to the horizontal charge transfer path 53. The horizontal charge transfer path 53 transfers the received electric charges from the right side to the left side to the output amplifier 54. The output amplifier 54 outputs a voltage corresponding to the received electric charges. Namely, it outputs a signal of the second image.

Thereafter, the first and second images are synthesized as illustrated in FIGS. 12A to 12C.

The operation of the solid state image pickup device described above does not pose any problem so long as the subject is stationary. However, if the subject is moving, the following problem occurs. Since there is a long time between the first image pickup operation of long-time exposure and the second image pickup operation of short-time exposure, the position of the subject during the first image pickup operation becomes different from that of the subject during the second image pickup operation. The synthesized image therefore has a blurred subject image.

This problem can be solved by shortening the exposure time of the second image pickup operation. The exposure of the second image pickup operation starts immediately after the data read operation shown in FIG. 14 and terminates immediately after the data read operation shown in FIG. 17. During this period, charges of the first image are transferred. Therefore, the exposure time for the second image pickup operation cannot be shortened more than the charge transfer time of the first image. The charge transfer time for one frame image is about 1/60 to 1/15 second.

SUMMARY OF THE INVENTION

It is an object of the present invention to provide an image pickup apparatus capable of picking an image of a moving subject in a broad dynamic range and with a high image quality.

According to one aspect of the present invention, there is provided an image pickup apparatus comprising: a plurality of photoelectric conversion elements each generating an electric signal through photoelectric conversion; a plurality of signal storage elements for storing the electric signals generated by the photoelectric conversion elements; a plurality of gates for reading the electric signals generated by the photoelectric conversion elements and storing the read electric signals in the signal storage elements; control means for performing a first image pickup operation by making the photoelectric conversion elements generate the electric signals, reading the generated electric signals and storing the read electric signals in the signal storage elements, thereafter performing a second image pickup operation under an image pickup condition different from the first image pickup operation by making the photoelectric conversion elements generate the electric signals, thereafter outputting the electric signals generated by the first image pickup operation and stored in the signal storage elements to an external, and thereafter reading the electric signals generated by the second image pickup operation from the photoelectric conversion elements, storing the read electric signals in the signal storage elements, and outputting the electric signals to the external; and synthesizing means for generating an image signal by subjecting the output electric signals generated by the first and second image pickup operations to a white clip process and synthesizing the output electric signals.

After the first and second image pickup operations are performed, the electric signals generated by the first and second image pickup operations are output to the external. The second image pickup time can be shortened without being limited by the transfer time of the electric signals generated by the first image pickup operation. Since the second image pickup time can be shortened, a blurred subject in images obtained by the first and second image pickup operations can be suppressed and the image signals of a high quality can be obtained.

Since the electric signals generated by the first and second image pickup operations are subjected to a white clip process and synthesized, the image signals can be obtained in a broad dynamic range.

DETAILED DESCRIPTION OF THE PREFERRED EMBODIMENTS

Figure 1:
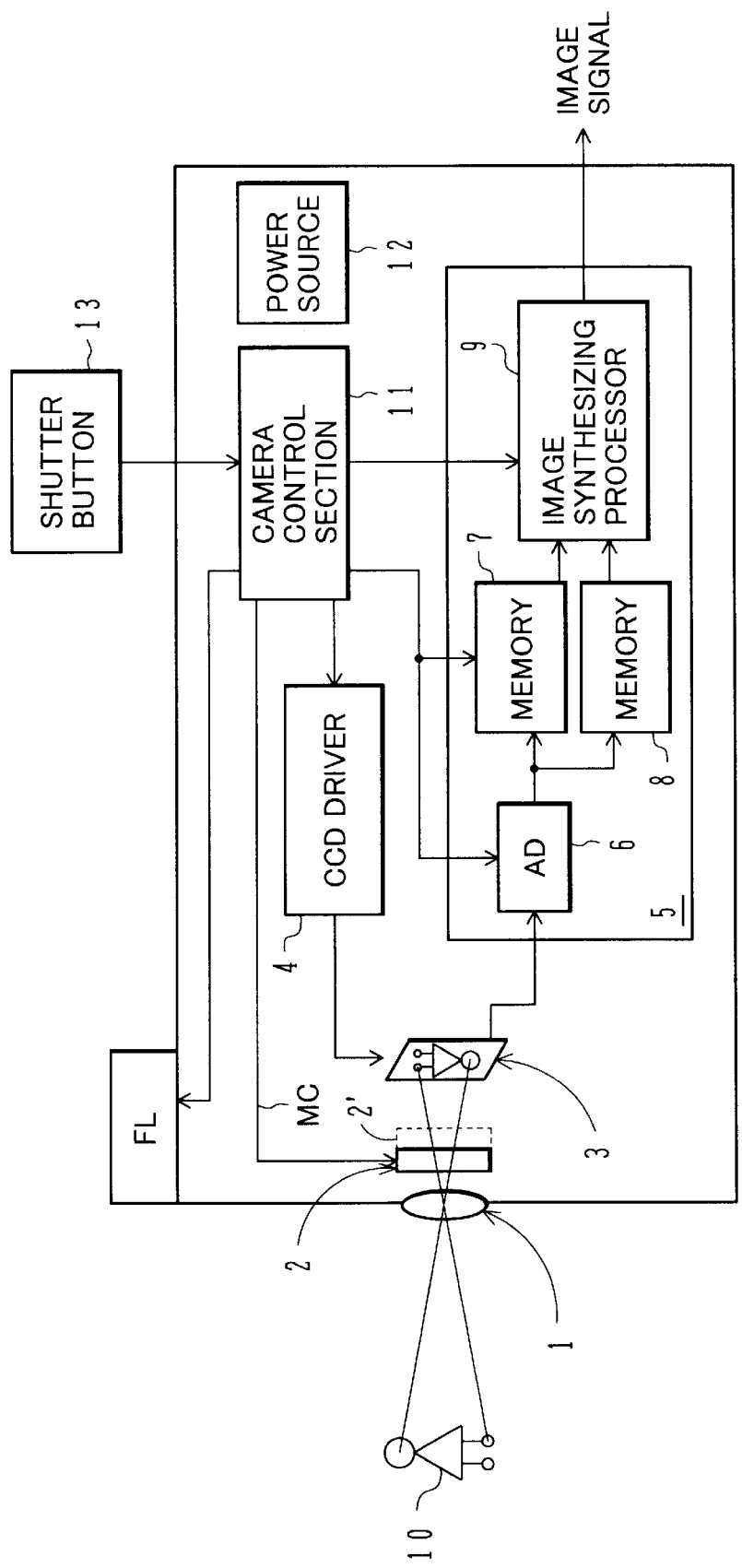
FIG. 1 is a block diagram showing the structure of an image pickup apparatus according to an embodiment of the invention.

FIG. 1 is a diagram showing the structure of an image pickup apparatus (e.g., a digital camera) according to an embodiment of the invention.

A lens 1 focusses an image of a subject 10 on a solid state image pickup device 3 when a mechanical shutter 2 is opened. The mechanical shutter 2 is controlled to be opened and closed in response to a signal MC supplied from a camera control section 11. While the mechanical shutter 2 is opened, light from the subject 10 reaches the solid state image pickup device 3. While the mechanical shutter 2 is closed, light from the subject 10 is intercepted and does not reach the solid state image pickup device 3.

A shutter button 13 is activated by a photographer. After the shutter button 13 is depressed, the camera control section 11 controls the mechanical shutter 2, a CCD driver 4 and an image processing section 5. A power source 12 supplies electric power to the image pickup apparatus to drive it. A flash lamp FL radiates illumination light in response to a signal from the camera control section 11.

The CCD driver 4 controls the solid state image pickup device 3. The solid state image pickup device 3 generates an image signal corresponding to the incidence light amount of the subject and supplies it to the image processing section 5. The image processing section 5 has an A/D converter 6, two frame memories 7 and 8 and an image synthesizing processor 9.

The solid state image pickup device 3 has photodiodes and charge transfer paths (CCD). Photodiodes correspond to pixels and two-dimensionally disposed in vertical and horizontal directions. The photodiodes convert light applied to a light receiving area into electric charges to perform so-called photoelectric conversion. The charge transfer path transfers electric charges converted by each photodiode. The electric charges are generally converted into a voltage which is supplied to an A/D converter 6. The A/D converter 6 converts an analog voltage supplied from the solid state image pickup device into a digital voltage.

When a photographer depresses the shutter button 13 to pick up one image, the solid state image pickup device 3 outputs first and second image signals of an image picked up at different exposure times.

Each of the memories 7 and 8 can store an image of one frame. The memory 7 stores the first image signals, and the memory 8 stores the second image signals.

The image synthesizing processor 9 synthesizes the first and second image signals stored in the memories 7 and 8 to form image signals in a broad dynamic range. For example, the method of synthesizing image signals is a simple addition of image signals or an addition of image signals after they are weighted by predetermined coefficients.

Figure 4:
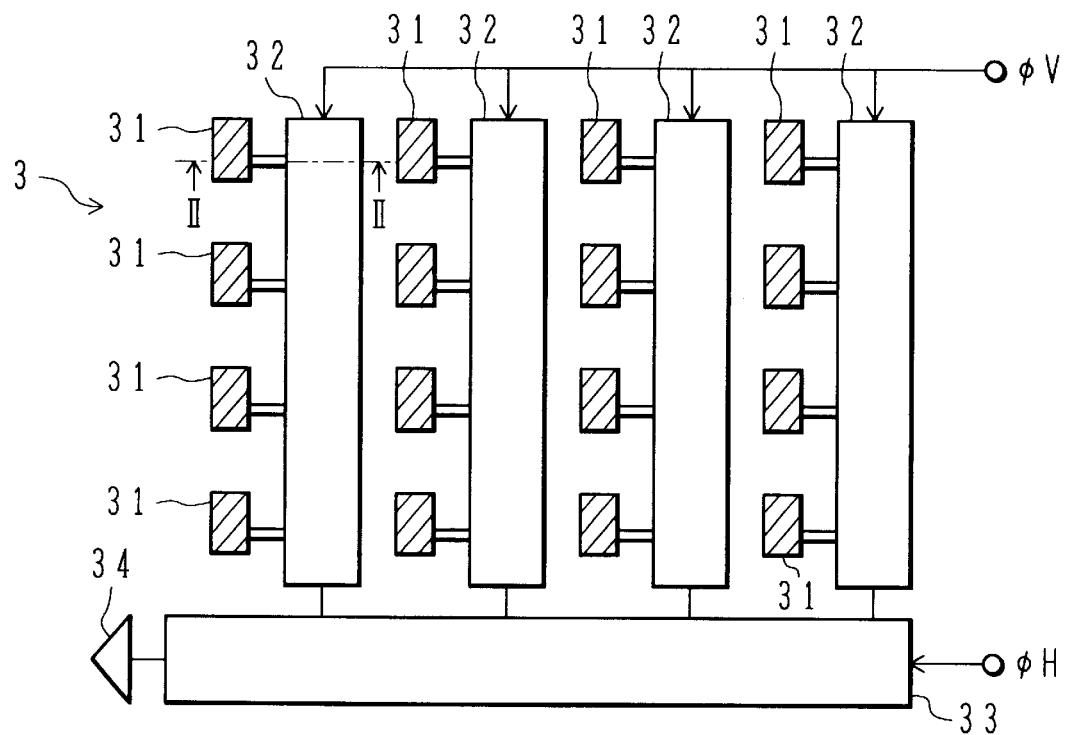
FIGS. 4 to 10 are plan views of a solid state image pickup device illustrating first to seventh operations of the device according to the embodiment.

FIG. 4 is a plan view of the solid state image pickup device 3.

There are two types of the solid state image pickup device, an all-pixel read type and an interlace type. The solid state image pickup device 3 of this embodiment is an all-pixel read type and can read at the same time signals of all pixels (photodiodes) as one frame image and output them to an external. An interlace type solid state image pickup device first reads pixels of odd lines as a first frame image, and then reads pixels of even lines as a second frame image. The first and second frame images are synthesized to form image signals of one frame.

The solid image pickup device 3 has: a plurality of photoelectric conversion elements (e.g., photodiodes) 31 disposed in a two-dimensional matrix shape for photoelectric conversion; vertical charge transfer paths (VCCD) 32 for transferring electric charges in a vertical direction; a horizontal charge transfer path (HCCD) 33 for transferring electric charges in a horizontal direction; and an output amplifier 34 for outputting a voltage corresponding to electric charges to an external. The vertical and horizontal charge transfer paths 32 and 33 are both made of charge coupled devices (CCDs).

The vertical charge transfer path 32 is driven by a drive signal φV, and the horizontal charge transfer path 33 is driven by a drive signal φH.

The all-pixel read type solid state image pickup device 3 has at least one charge transfer stage (charge transfer packet) in the vertical charge transfer path 32 in an area corresponding to each photodiode 31. In order to provide one charge transfer stage per one photodiode 31, it is necessary to form three or more electrodes in the vertical charge transfer path in the area corresponding to each photodiode 31 and to drive the vertical charge transfer path by three or more phases. The charge transfer stage is the unit of partitioning the charge transfer path. When a plurality of pulse signals having different phases are applied to charge transfer electrodes consecutively formed along the charge transfer path, electric charges are transferred in the minimum charge transfer area. This minimum charge transfer area is called one charge transfer stage. If an n-phase drive (n is an integer of 2 or larger) is used, the area where n consecutive charge transfer electrodes are formed is called one charge transfer stage.

Figure 2:
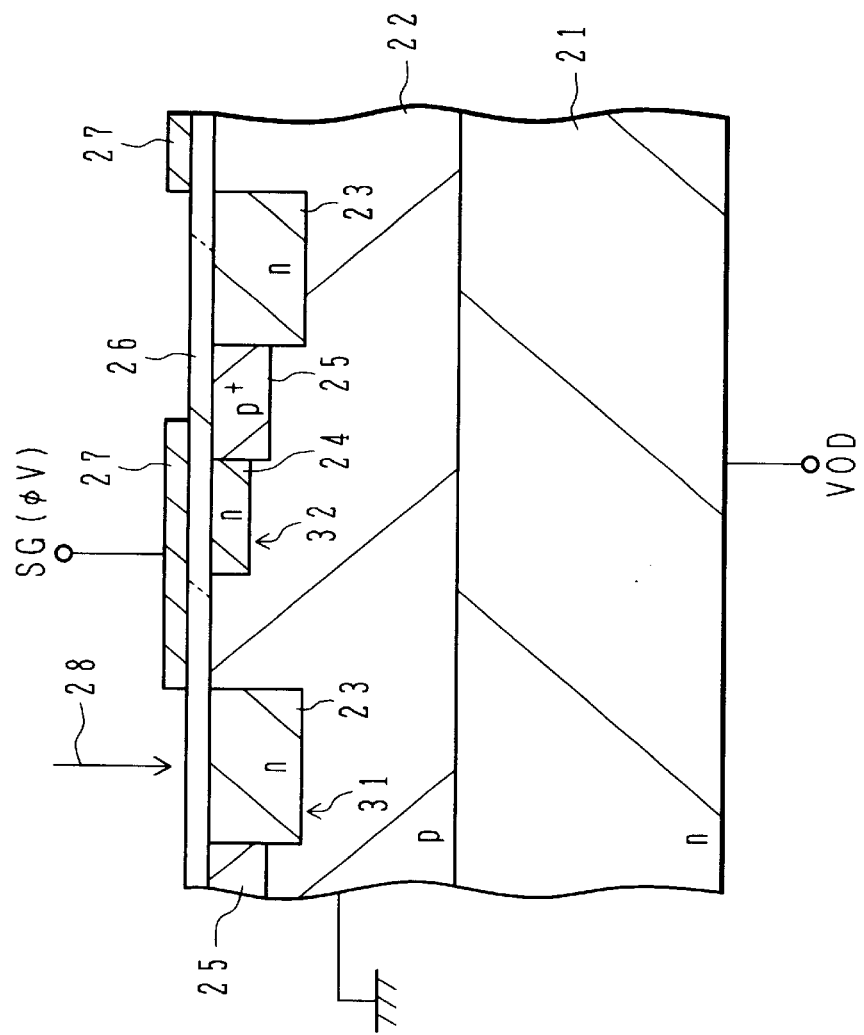
FIG. 2 is a cross sectional view of a solid state image pickup device.

FIG. 2 is a cross sectional view of the solid state image pickup device 3 shown in FIG. 4 and taken along line II—II.

A p-type well 22 is formed in a surface layer of an n-type silicon substrate (semiconductor substrate) 21. In a surface layer of the p-type well 22, an n-type region 23 constituting the photodiode 31 and an n-type region 24 constituting the vertical charge transfer path 32 are formed. Between the n-type region 24 and another n-type region 23, a p$^+$-type region 25 constituting a channel stopper region is formed.

A shift gate electrode 27 is formed on an insulating film (e.g., silicon oxide film) 26 over the n-type region 24 constituting the vertical charge transfer path 32. A shift gate signal SG is applied to the shift gate electrode 27. As the shift gate signal SG of a positive potential equal to or larger than a predetermined value is applied, electric charges accumulated in the photodiode 31 are read and stored in the vertical transfer path 32.

The shift gate electrode 27 functions also as a charge transfer electrode. As a drive signal φV is applied to the charge transfer electrode 27, the vertical charge transfer path 32 transfers the electric charges. The drive signal φV is a pulse having a ground potential as one level and a predetermined negative potential as the other level.

The n-type substrate 21 is applied with a substrate potential VOD. The p-type well 22 is grounded.

Light 28 becomes incident upon the photodiode 31. This light applied to the photodiode 31 generates electric charges in the n-type region 23. As electric charges are accumulated too much in the n-type region, some of electric charges in the n-type region 23 overflows to the n-type substrate 21. This structure is called a vertical overflow drain structure.

As the substrate voltage VOD is raised to a predetermined value or higher, electric charges in the photodiode 31 can be drained to the n-type substrate 21 so that the photodiode 31 can be initialized. This operation is called an electronic shutter. After the electronic shutter is activated, charge accumulation in the photodiodes can be started.

Figure 3:
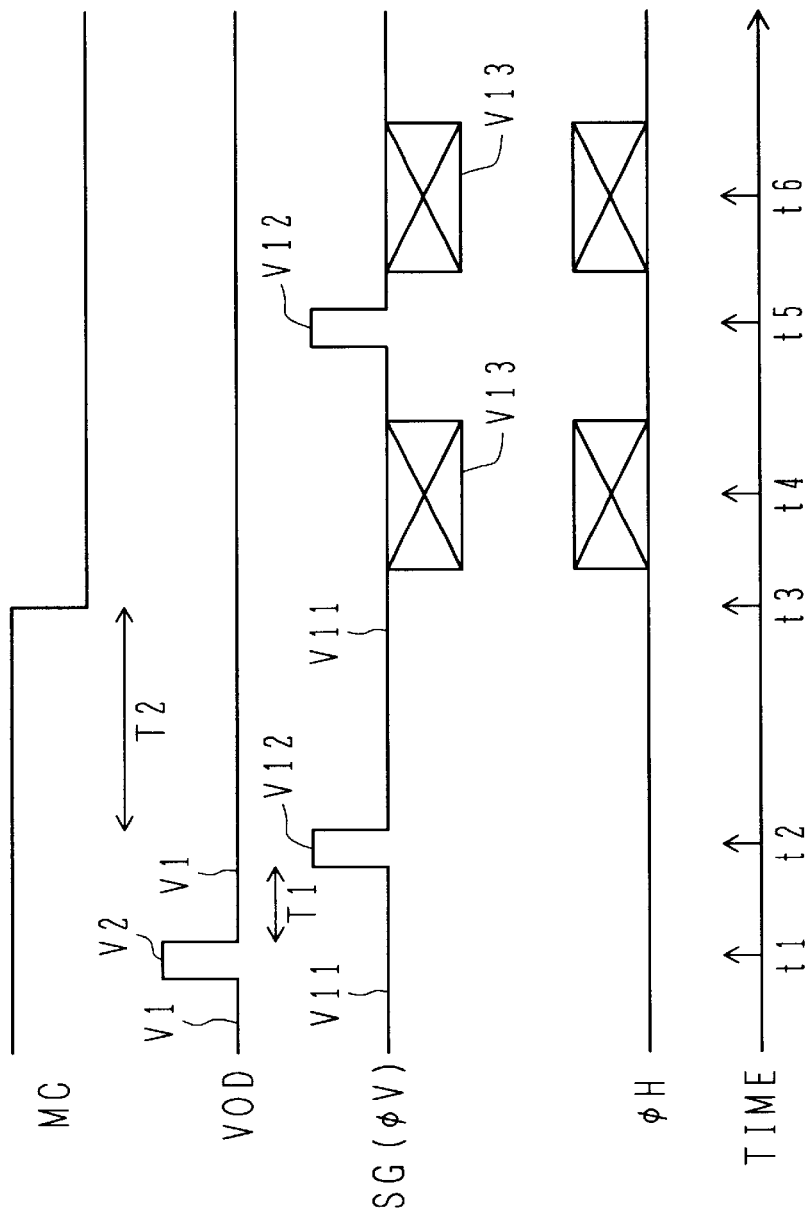
FIG. 3 is a timing chart illustrating the operation of the image pickup apparatus.

FIG. 3 is a timing chart illustrating the operation of the image pickup apparatus (digital camera) shown in FIG. 1.

The mechanical shutter signal MC controls to open and close the mechanical shutter 2 (FIG. 1). While this signal MC takes a high level, the mechanical shutter 2 is opened, and while the signal MC takes a low level, the mechanical shutter 2 is closed.

The substrate voltage VOD has two voltage levels V1 and V2. At the voltage level V2, electric charges stored in the photodiode 31 are drained to the substrate to thereby initialize the photodiode 31. At the voltage level V1, the overflow drain function is enabled.

At the positive potential of the shift gate signal SG, electric charges in the photodiode 31 can be read and stored in the vertical charge transfer path 32, and at the negative potential of the charge transfer signal φV, electric charges in the vertical charge transfer path 32 can be transferred.

A charge transfer signal φH is used for transferring electric charges in the horizontal charge transfer path 33.

A first exposure time T1 for a first image pickup operation is a time from when a pulse V2 is supplied as the substrate voltage VOD to when a pulse V12 is supplied as the shift gate signal SG. A second exposure time T2 for a second image pickup operation is a time from when the pulse V12 is supplied as the shift gate signal SG to when the mechanical shutter signal MC takes the low level.

The operation of the solid state image pickup device 3 will be described with reference to FIGS. 4 to 10.

First, as shown in FIG. 4, a first exposure (e.g., short-time exposure) for a first image starts to accumulate electric charges in the photodiodes 31.

This operation corresponds to a timing t1 shown in FIG. 3. The mechanical shutter signal MC is maintained at a high level to maintain the open state of the mechanical shutter 2 (FIG. 1). The mechanical shutter 2 is normally open.

At the timing t1, the substrate voltage VOD is changed from the voltage V1 (e.g., 10 V) to the voltage V2 (e.g., 25 to 39 V) (electronic shutter function) to initialize the photodiodes 31. Thereafter, the substrate voltage VOD takes again the voltage V1. Upon initialization of the photodiodes 31, the first exposure time T1 starts.

Figure 5:
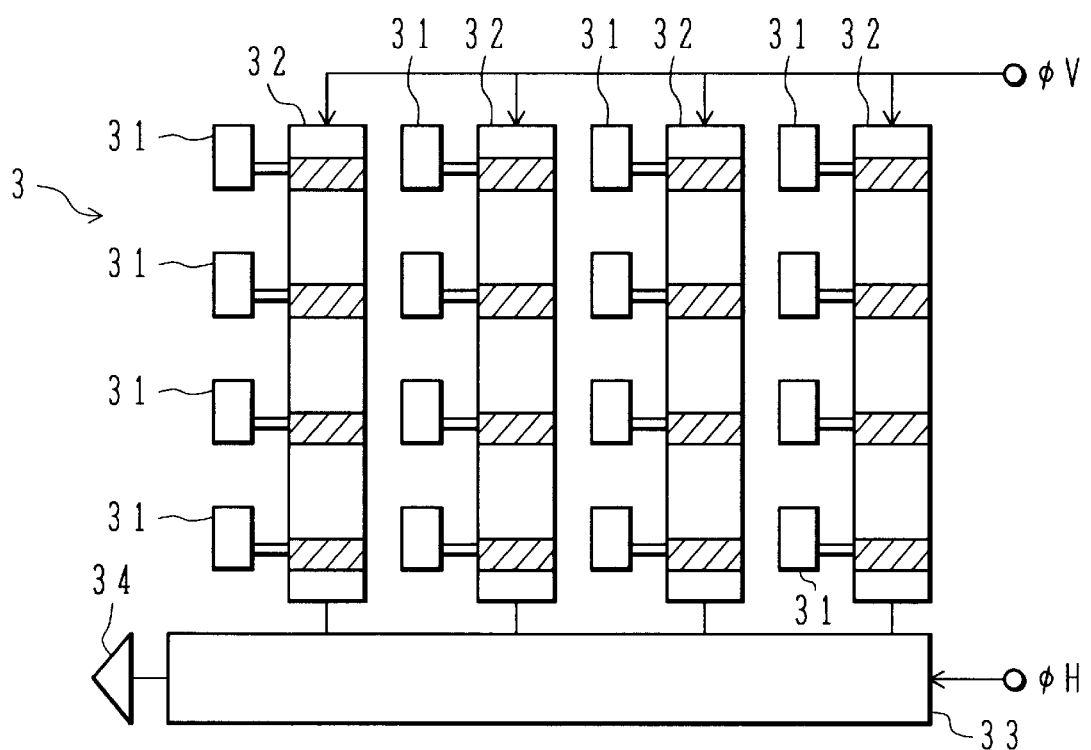

Next, as shown in FIG. 5, electric charges of the first image stored in the photodiodes 31 are read and stored in the right vertical charge transfer paths 32.

This operation corresponds to a timing t2 shown in FIG. 3. The shift gate signal SG is changed from the voltage V11 (e.g., 0 V) to the voltage V12 (e.g., 15 V) to transfer the electric charges in the photodiodes 31 to the vertical charge transfer paths 32. Thereafter, the shift gate signal SG takes again the voltage V11. Upon this charge transfer, the first exposure (e.g., short-time exposure) T1 for the first image is terminated and a second exposure (e.g., long-time exposure) T2 for a second image starts.

Figure 6:
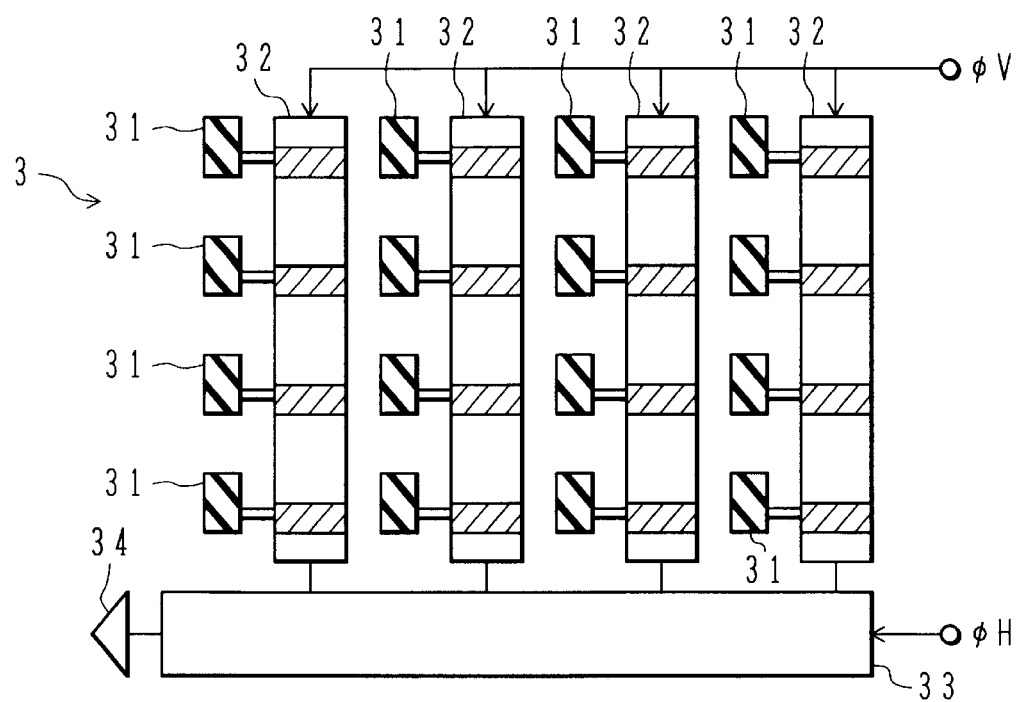

Next, as shown in FIG. 6, the mechanical shutter 2 (FIG. 1) is closed to terminate the second exposure. At this time, the electric charges of the first image are being stored in the vertical charge transfer paths 32, whereas the electric charges of the second image are being stored in the photodiodes 31.

This operation corresponds to a timing t3 shown in FIG. 3. The level of the mechanical shutter signal MC is changed from the high level to the low level to close the mechanical shutter 2 (FIG. 1). When the mechanical shutter 2 is closed, the second exposure time T2 is terminated.

Figure 7:
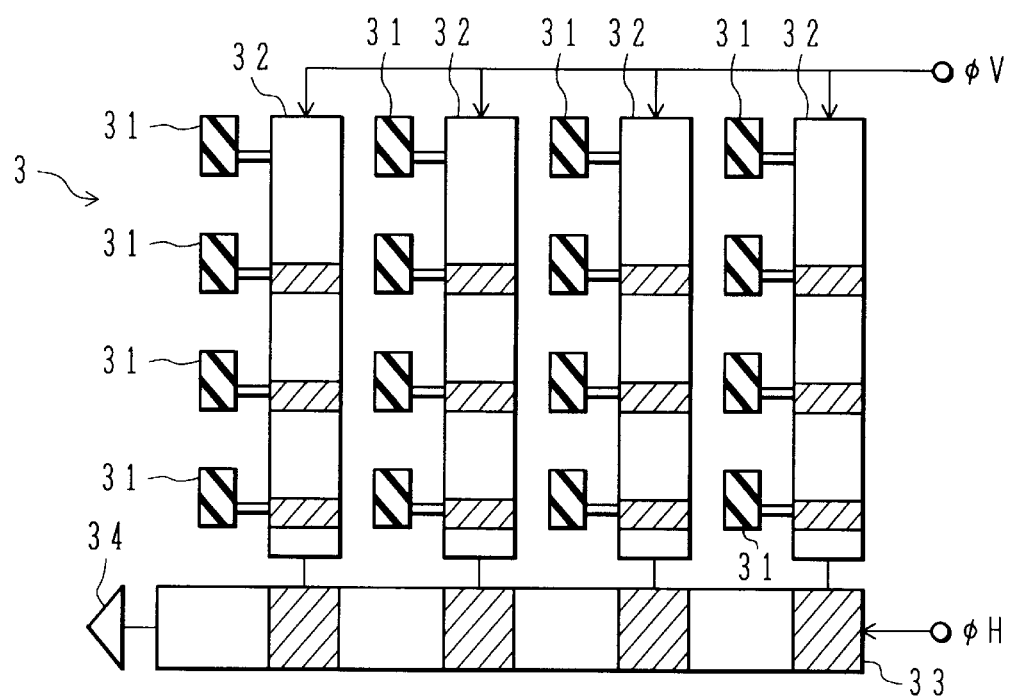

Next, as shown in FIG. 7, the electric charges of the first image stored in the vertical charge transfer paths 32 are transferred downward to the horizontal charge transfer path 33. The horizontal charge transfer path 33 transfers the received electric charges to the left and supplies them to the output amplifier 34. The output amplifier 34 outputs voltages corresponding to the received electric charge amounts. Namely, it outputs first image signals.

During this charge transfer, the mechanical shutter 2 is closed so that new electric charges are not generated in the photodiodes 31 and therefore smear is not generated. This smear is the phenomenon that when strong light is applied to the photodiode, electric charges in the photodiode 31 leak to the vertical charge transfer path 32 and the image quality is degraded.

This operation corresponds to a timing t4 shown in FIG. 3. As the charge transfer signal φV, a pulse having a voltage V11 (e.g., 0 V) as one level and a voltage V13 (e.g., −8 V) as the other level is supplied. With this pulse, the electric charges in the vertical charge transfer path 32 are transferred in the vertical direction.

As the charge transfer signal φH, a predetermined pulse is supplied so that the electric charges in the horizontal charge transfer path 33 are transferred in a horizontal direction.

Figure 8:
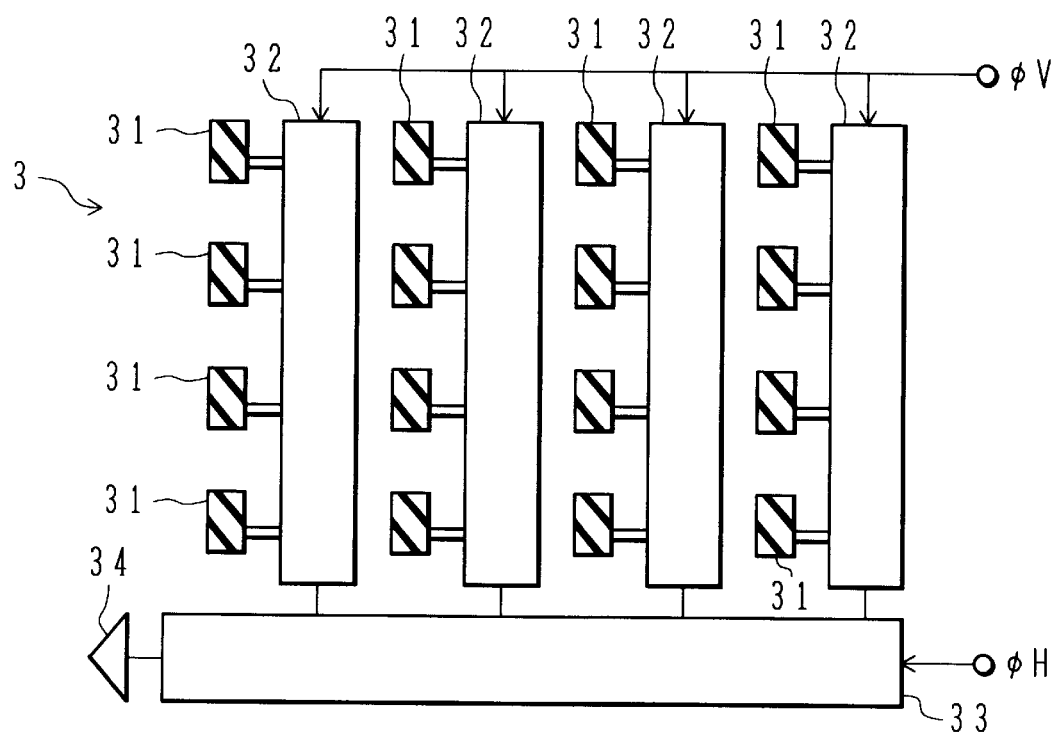
Figure 11:
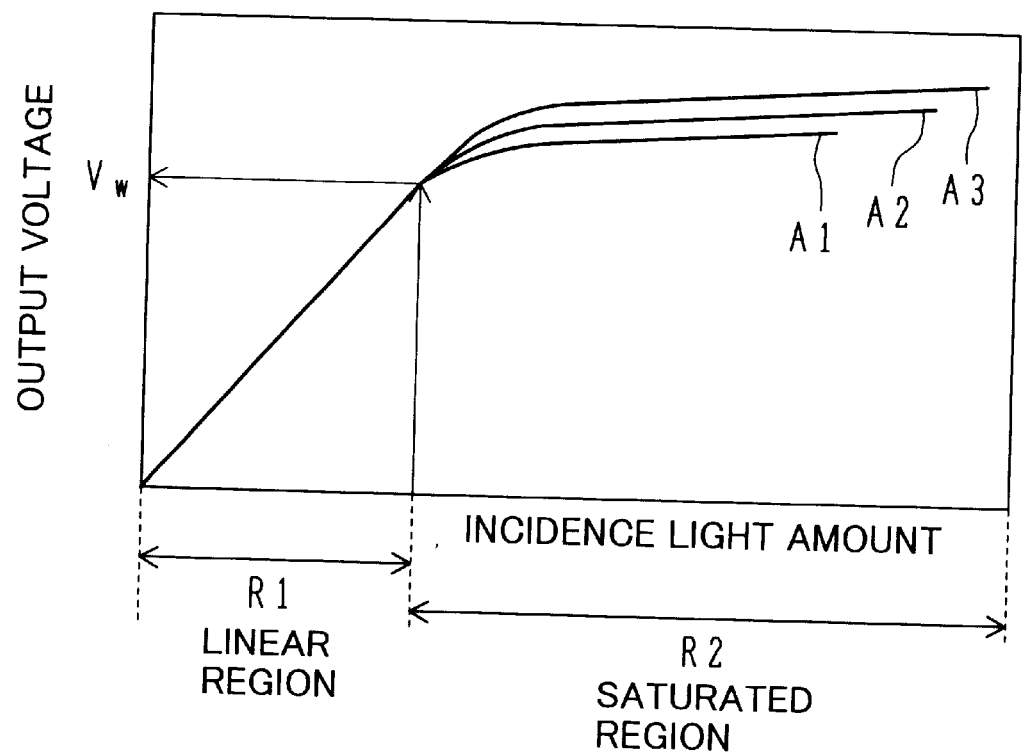
FIG. 11 is a graph showing the photoelectric conversion characteristics of photodiodes of a solid image pickup device.

As shown in FIG. 8, the first image signal transferred and output from the output amplifier 34 is subjected to the white clip process shown in FIG. 11. With this white clip process, an output voltage of Vw or higher is converted into a voltage Vw. The image signal subjected to the white clip process is written in the frame memory 7 (FIG. 1).

Figure 9:
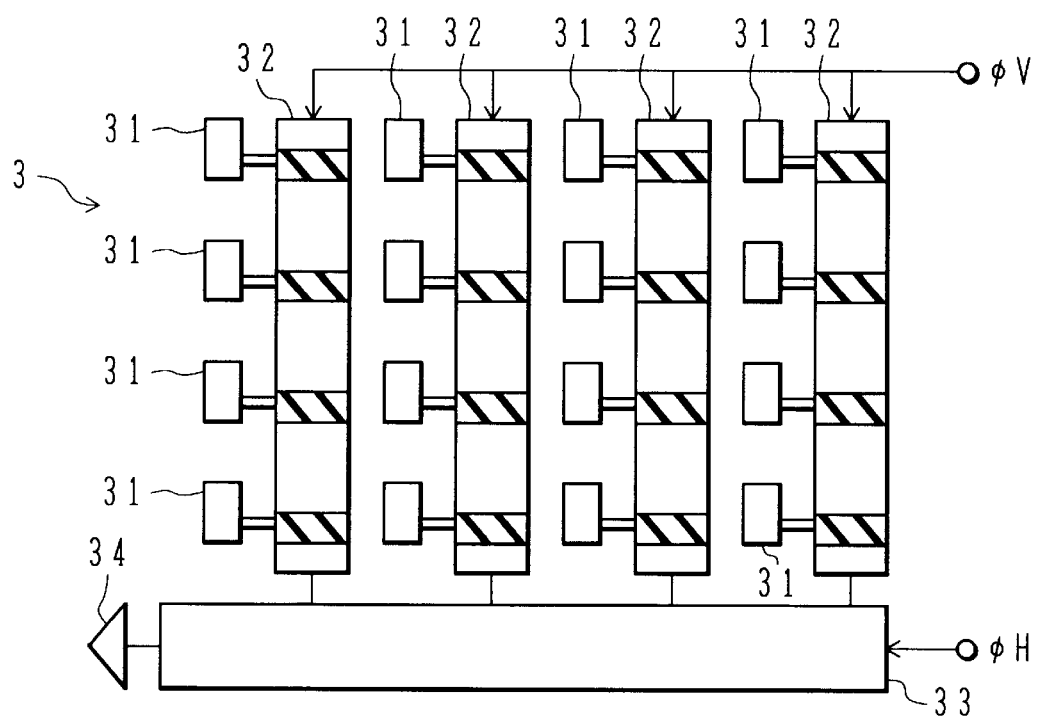

Next, as shown in FIG. 9, electric charges of the second image stored in the photodiodes 31 are read and stored in the right vertical charge transfer paths 32.

This operation corresponds to a timing t5 shown in FIG. 3. The shift gate signal SG is changed from the voltage V11 (e.g., 0 V) to the voltage V12 (e.g., 15 V) to transfer the electric charges in the photodiodes 31 to the vertical charge transfer paths 32. Thereafter, the shift gate signal SG takes again the voltage V11.

Figure 10:
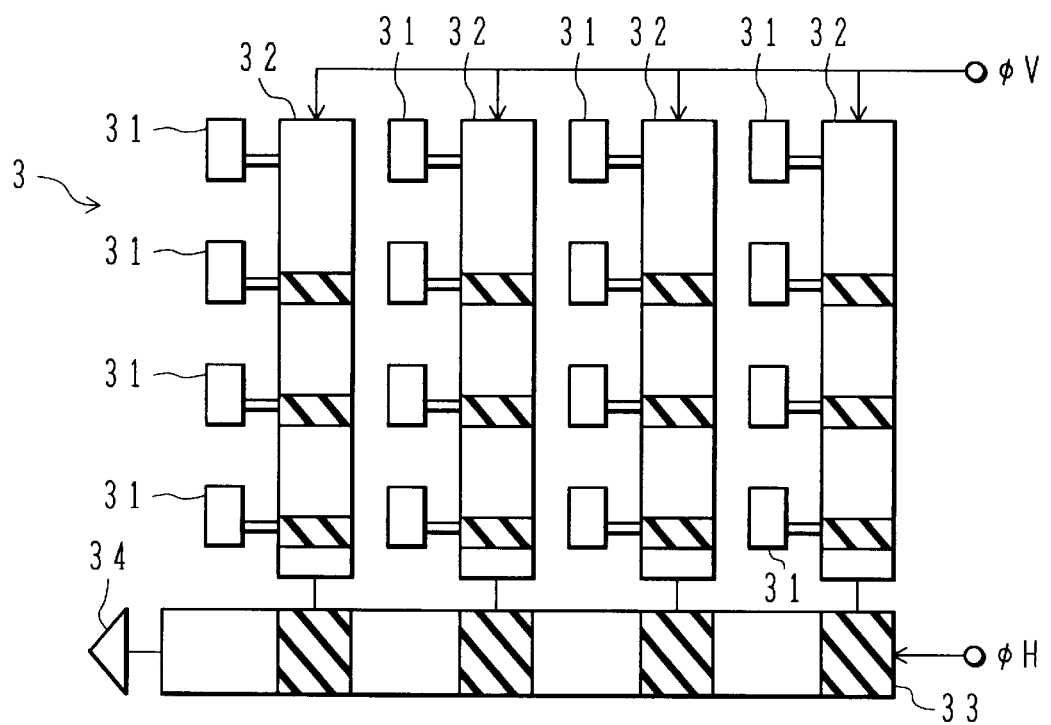

Next, as shown in FIG. 10, the electric charges of the second image stored in the vertical charge transfer paths 32 are transferred downward to the horizontal charge transfer path 33. The horizontal charge transfer path 33 transfers the received electric charges to the left and supplies them to the output amplifier 34. The output amplifier 34 outputs voltages corresponding to the received electric charge amounts. Namely, it outputs second image signals.

This operation corresponds to a timing t6 shown in FIG. 3. Predetermined pulses are supplied as the charge transfer signal φV and φH. With these pulses, the electric charges in the vertical charge transfer path 32 and horizontal charge transfer path 33 are transferred.

Next, the second image signal output from the output amplifier 34 is subjected to the white clip process. The image signal subjected to the white clip process is written in the frame memory 8 (FIG. 1).

Figure 12A:
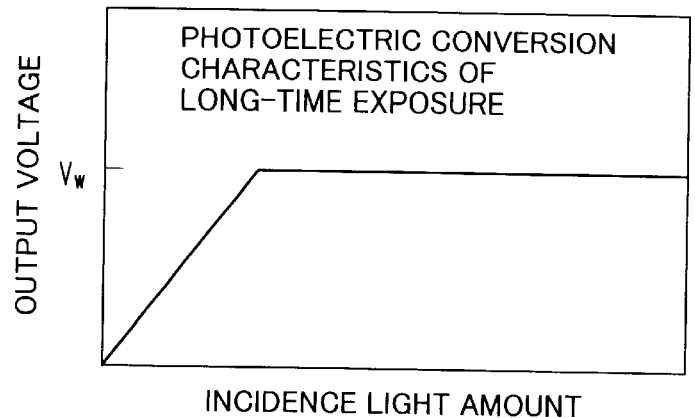
FIGS. 12A to 12C are graphs illustrating an image synthesizing process which broadens a dynamic range of a solid image pickup device.
Figure 12B:
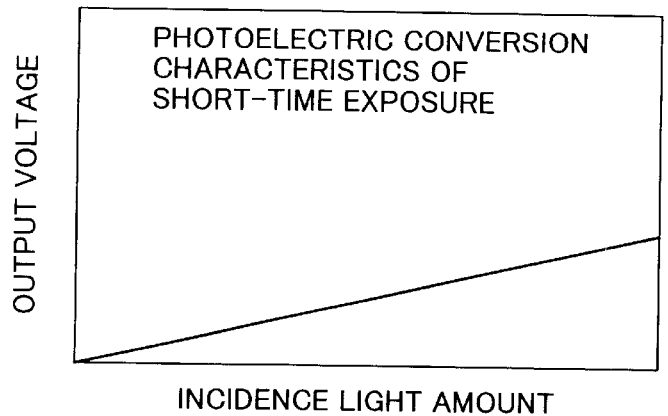
Figure 12C:
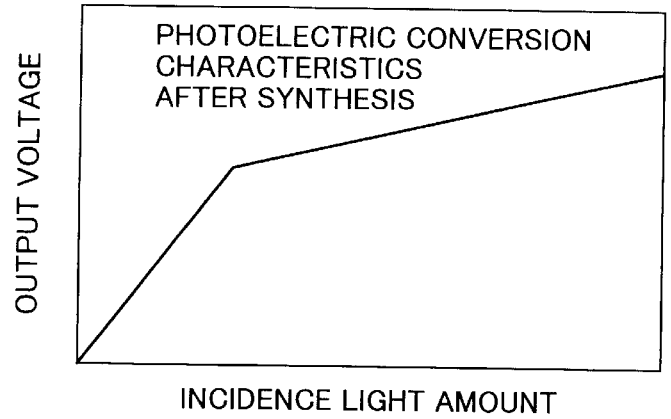
Figure 13:
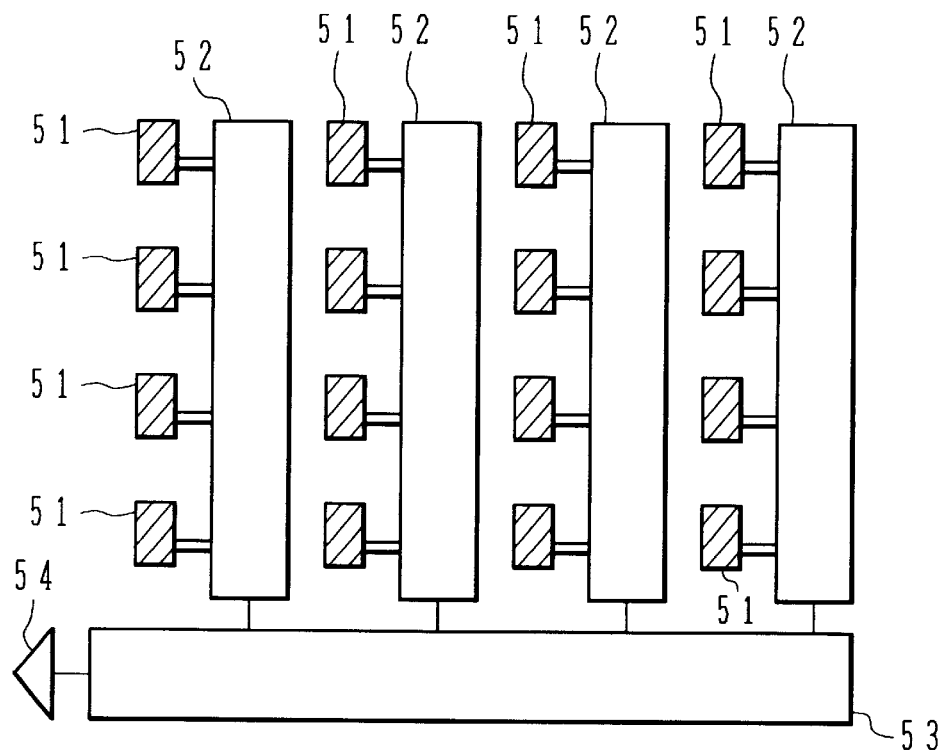
FIGS. 13 to 17 are plan views of a solid state image pickup device illustrating first to fifth operations of the device according to conventional techniques.
Figure 14:
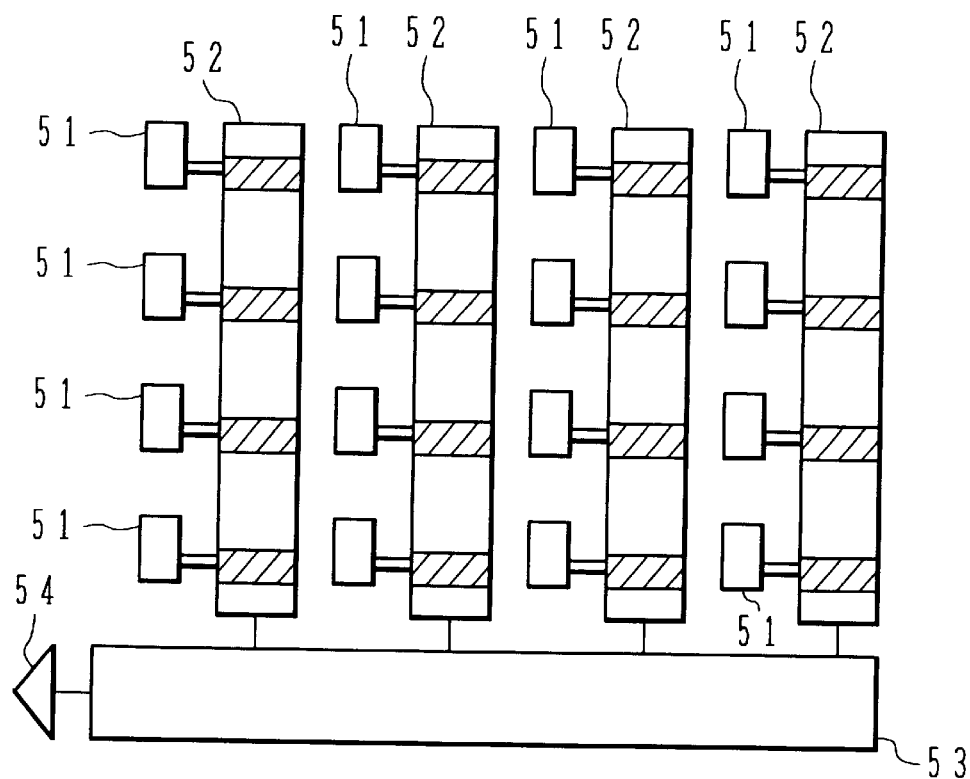
Figure 15:
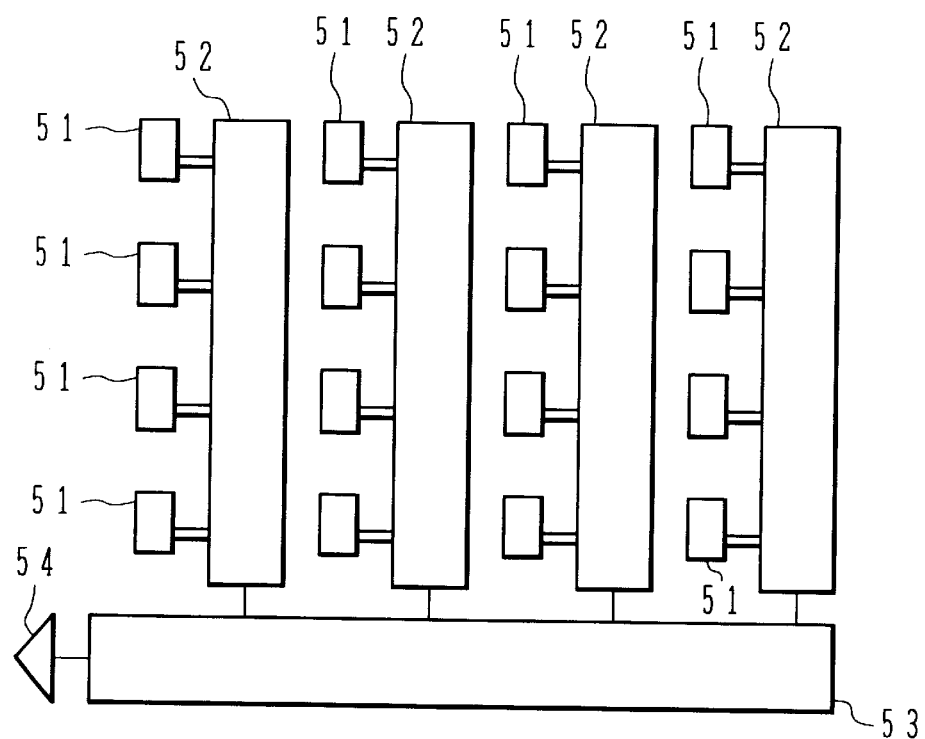
Figure 16:
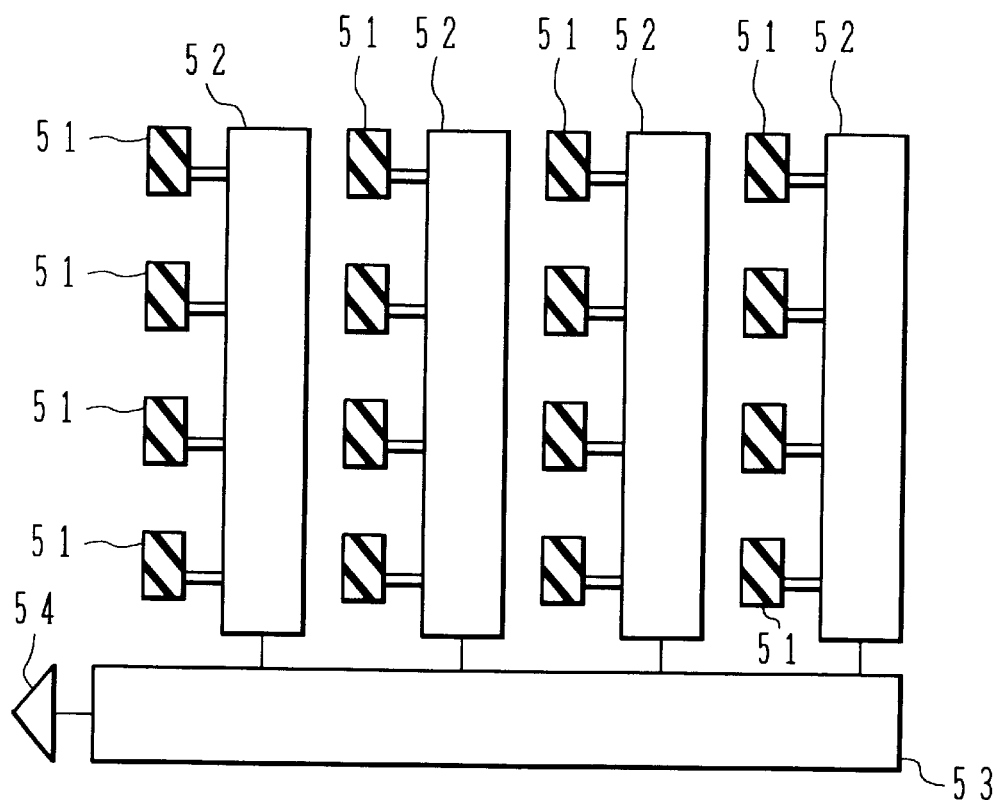
Figure 17:
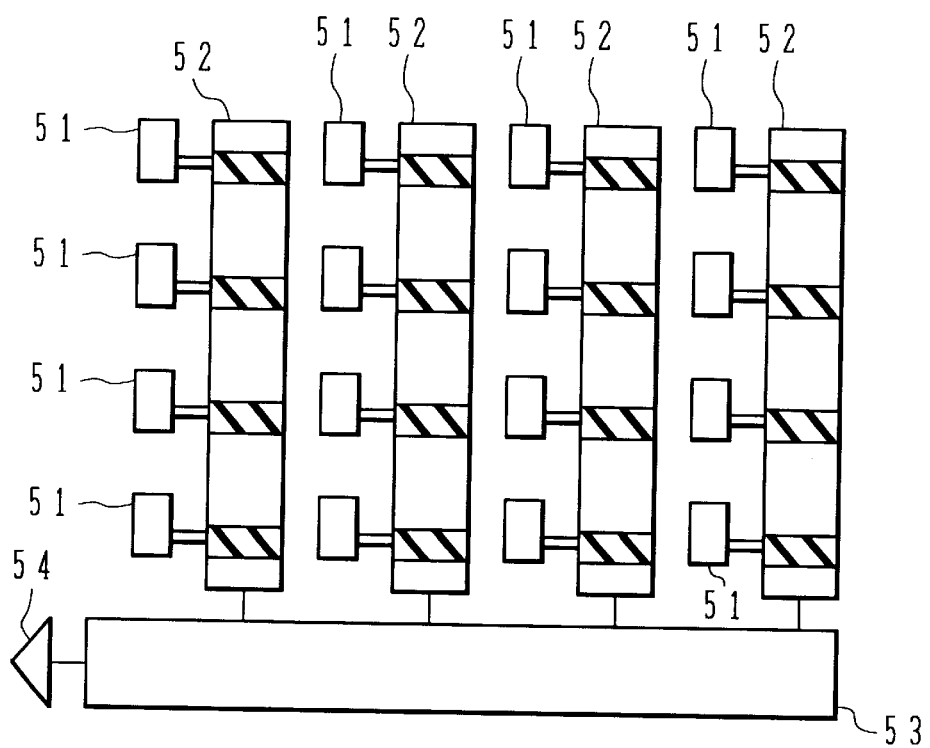

Next, as shown in FIG. 12C, the first image signals in the frame memory 7 and the second image signals in the frame memory 8 are synthesized. With this synthesis, the dynamic range of the solid state image pickup device can be broadened.

The second exposure time T2 starts when the electric charges in the photodiodes 31 are read and terminates when the mechanical shutter 2 is closed, as shown in FIG. 3. During the second exposure time T2, the electric charges of the first image are being stored in the vertical charge transfer paths 32 and are not output to the external. It is not necessary to set the second exposure time T2 equal to or longer than the charge transfer time of the first image. The second exposure time T2 can therefore be shortened.

Since the second exposure time T2 can be shortened, a time between the first and second image pickup operations can be shortened and a blurred subject image between the first and second images can be suppressed. Since the blurred subject image between the first and second images can be suppressed, the quality of a synthesized image can be improved.

The solid state image pickup device 3 is of the all-pixel read type. Therefore, in both the first and second image pickup operations, all pixels can be read and the image signals of a high quality can be generated.

The method of controlling a solid state image pickup device of this embodiment may be used together with the solid state image pickup controlling method illustrated with reference to FIGS. 13 to 17.

Short-time and long-time exposures of the first and second exposures T1 and T2 may be reversed. The advantage that the first exposure is short-time exposure and the second exposure is long-time exposure will be described first.

Referring to FIG. 3, the first exposure time (short-time exposure) T1 is, for example, 1/300 second and the second exposure time (long-time exposure) T2 is, for example, 1/30 second. The second exposure time T2 is terminated when the mechanical shutter 2 is closed. A time taken for the mechanical shutter 2 to completely close after it starts closing is preferably set to 1/10 of the exposure time T2 or shorter. For example, if the exposure time T2 is 1/30 second, the operation time of the mechanical shutter 2 is required to be 1/300 second or faster.

If the second exposure time T2 is short (e.g., 1/300 second), the operation time of the mechanical shutter 2 is required to be 1/3000 second or faster. It is therefore necessary to use a high speed mechanical shutter. A high speed mechanical shutter is expensive so that the image pickup apparatus (digital camera) also becomes expensive.

By using the first exposure of short-time and the second exposure of long-time, an economical low speed mechanical shutter 2 can be used and the cost of the image pickup apparatus (digital camera) can be reduced.

Next, the advantage that the first exposure is long-time exposure and the second exposure is short-time exposure will be described.

If the first exposure is short-time exposure and the second exposure is long-time exposure, it takes a long time to output the image signal obtained by short-time exposure to the external. Since white pixel defects (white spots) of an image and dark current increase as the output time of the image signal prolongs, the image quality is degraded and the manufacture yield of solid state image pickup devices is lowered.

If the second exposure is short-time exposure, the time taken to output the image signal obtained by short-time exposure can be shortened. Since the white pixel defects of an image and the like can be reduced, the image quality and the manufacture yield of solid state image pickup devices can be improved.

Next, modifications of the embodiment will be described. In the above embodiment, although two image pickup operations are performed at different exposure times, two image pickup operations may be performed under different image pickup conditions without being limited only to the exposure time. Examples of different image pickup conditions will be described.

(1) Exposure time

In the above embodiment, the exposure time is set differently by using a combination of the mechanical shutter and electronic shutter. The exposure time may be set differently by other methods.

(2) Subject illuminance

For example, a variable light source may be used to differently set the illuminance of the first and second image pickup operations, or a flash lamp may be used to differently set the subject illuminance.

(3) Optical system transmittance

A neutral density (ND) filter attenuates light over the whole range of wavelengths. If a neutral filter 2' is set at the same position as, or at the juxtaposed position with, the mechanical shutter 2 shown in FIG. 1, the transmittance of the optical system along the incidence light path to the photodiodes can be set differently. Similarly, if a liquid crystal device is set at the same position as the mechanical shutter 2 or neutral filter 2', the optical system transmittance can be set differently.

(4) Stop

If the diameter of a stop of a digital camera is made large, an image incident upon a solid state image pickup device can be made bright, whereas if the diameter of the stop is made small, an image incident upon the solid state image pickup device can be made dark. The two image pickup operations can be performed by differently setting the stop diameters.

(5) Number of exposures

The two image pickup operations may be performed by differently setting the number of exposures. The number of exposures can be differently set by changing the number of times when a mechanical shutter is opened. For example, the mechanical shutter is opened once during the first image pickup operation, and it is opened three times during the second image pickup operation. The number of exposures may be changed by changing the number of times when a flash lamp is turned on.

Instead of a solid state image pickup device having a charge coupled device (CCD), a MOS sensor may also be used.

Figure 18A:
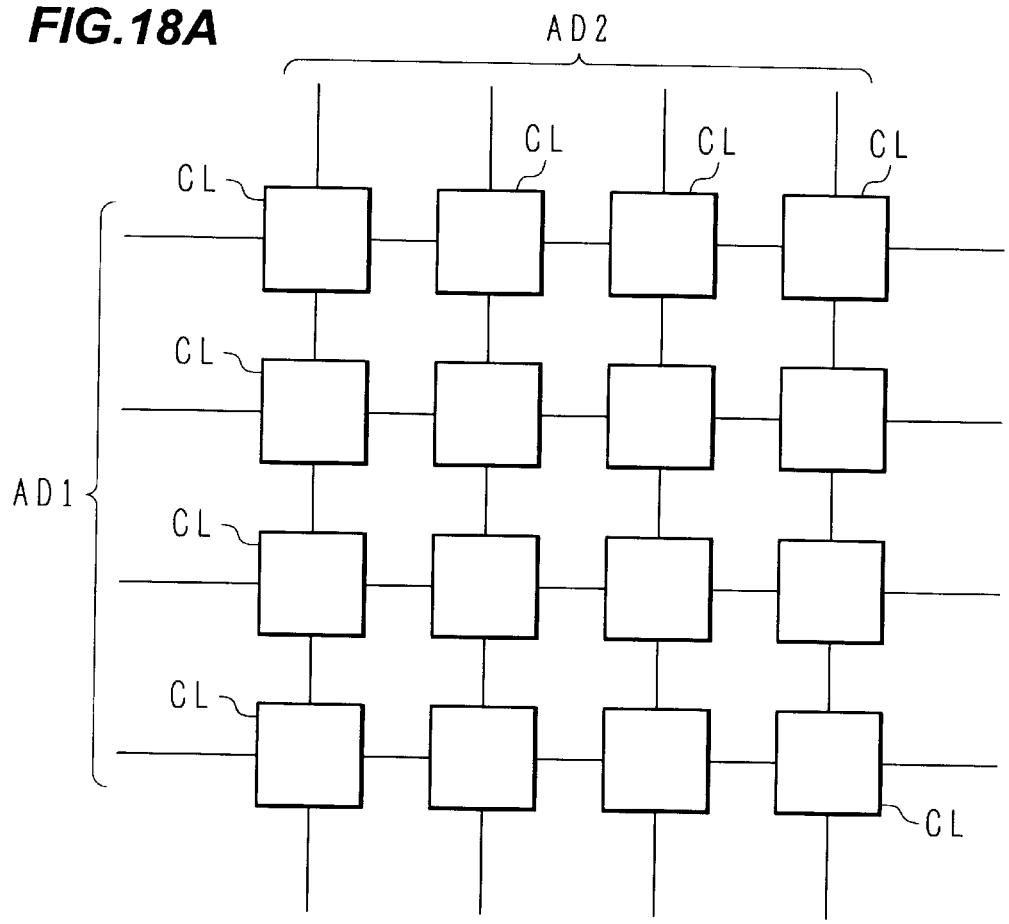
FIGS. 18A and 18B are circuit diagrams of a MOS sensor.

FIG. 18A shows the structure of a MOS sensor. A MOS sensor has a plurality of cells CL disposed two-dimensionally on the same substrate. Each cell CL can be accessed by first and second addresses AD1 and AD2, similar to a RAM.

Figure 18B:
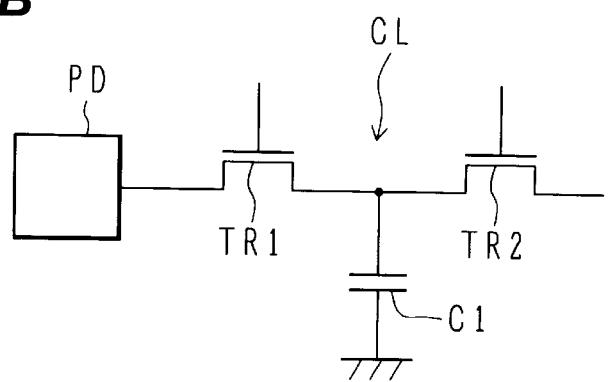

FIG. 18B shows the structure of each cell CL. Similar to a DRAM, each cell CL has a photodiode PD, a read gate MOS transistor TR1, a capacitor C1, and an output MOS transistor TR2. Electric charges accumulated in the photodiode PD are read when the transistor TR1 is made conductive, and stored in the capacitor C1. The electric charges stored in the capacitor C1 are output to an external by the transistor TR2. This capacitor C1 corresponds to the vertical charge transfer path 32 of the solid state image pickup device shown in FIG. 4.

The image pickup apparatus of this embodiment is not limited only to a digital camera, but it may be an image scanner, a line sensor, a video camera or the like. The image pickup apparatus of this embodiment is particularly suitable for picking up a still image.

The present invention has been described in connection with the preferred embodiments. The invention is not limited only to the above embodiments. It is apparent that various modifications, improvements, combinations, and the like can be made by those skilled in the art.

What is claimed is:

1. An image pickup apparatus comprising:

a semiconductor substrate;

a plurality of photoelectric conversion elements formed on said semiconductor substrate, each generating an electric signal through photoelectric conversion;

charge coupled device formed on said semiconductor substrate, having a plurality of charge transfer stages for storing and transferring the electric signals generated by said photoelectric conversion elements;

a plurality of gates formed on said semiconductor substrate, for reading the electric signals generated by said photoelectric conversion elements to said charge transfer stages of the charge coupled device;

control means for performing a first image pickup operation by allowing a first image to be incident on said photoelectric conversion elements to generate the electric signals, reading the generated electric signals to the charge transfer stages adjacent to said photoelectric conversion elements and storing the read electric signals in said charge transfer stages, thereafter performing a second image pickup operation under an image pickup condition different from the first image pickup operation by allowing a second image to be incident on said photoelectric conversion elements to generate the electric signals, while keeping the electric signals of the first image in said charge transfer stages of the charge coupled device thereafter transferring the electric signals of the first image through said charge coupled device and outputting them to an external, and thereafter reading the electric signals of the second image from said photoelectric conversion elements to said charge coupled device, transferring them through said charge coupled device, and outputting the electric signals to the external; and synthesizing means for generating an image signal by subjecting the output electric signals of the first and second images to a white clip process and synthesizing the output electric signals.

2. An image pickup apparatus according to claim 1, wherein said photoelectric conversion elements are photodiodes.

3. An image pickup apparatus according to claim 2, wherein the CCD has at least one charge transfer stage per each photodiode.

4. An image pickup apparatus according to claim 1, wherein the image pickup apparatus has a MOS structure wherein said photoelectric conversion elements are photodiodes, said signal storage elements are capacitors, and said gate are MOS transistors.

5. An image pickup apparatus according to claim 1, wherein said control means sets different image pickup conditions for the first and second image pickup operations, by changing at least one of an exposure time, a subject illuminance, a transmittance of an optical system along an incidence light path to said photoelectric conversion elements, a stop, and the number of exposures.

6. An image pickup apparatus according to claim 1, further comprising a mechanical shutter and said control means sets different image pickup conditions for the first and second image pickup operations by changing an exposure time of said mechanical shutter.

7. An image pickup apparatus according to claim 1, further comprising an illumination device and said control means sets different image pickup conditions for the first and second image pickup operations by changing a subject illuminance with said illumination device.

8. An image pickup apparatus according to claim 1, further comprising a liquid crystal device and said control means sets different image pickup conditions for the first and second image pickup operations by changing a transmittance of an optical system along a light incidence path to said photoelectric conversion elements.

9. An image pickup apparatus according to claim 1, wherein said control means sets different image pickup conditions for the first and second image pickup operations by performing the first image pickup operation at a long-time exposure and the second image pickup operation at a short-time exposure.

10. An image pickup apparatus according to claim 1, wherein said control means sets different image pickup conditions for the first and second image pickup operations by performing the first image pickup operation at a short-time exposure and the second image pickup operation at a long-time exposure.

11. An image pickup apparatus comprising:

a semiconductor substrate;

a plurality of photoelectric conversion elements disposed in a matrix shape in vertical and horizontal directions on a surface of said semiconductor substrate;

a plurality of gates formed on said semiconductor substrate adjacent to said photoelectric conversion elements for reading electric charges stored in said photoelectric conversion elements;

a plurality of vertical charge transfer paths each having a plurality of charge transfer stages in the vertical direction, said vertical charge transfer path being capable of receiving electric charges stored in at least one or more of said photoelectric conversion elements via said gates;

a horizontal charge transfer path connected to lower ends of said vertical charge transfer paths for transferring electric charges from said vertical charge transfer path in the horizontal direction;

an output amplifier for outputting electric charges transferred from said horizontal charge transfer path to an external;

control means for performing a first image pickup operation by allowing a first image to be incident on said photoelectric conversion elements to generate the electric signals, reading the generated electric signals to the charge transfer stages adjacent to said photoelectric conversion elements, thereafter performing a second image pickup operation under an image pickup condition different from the first image pickup operation by allowing a second image to be incident on said photoelectric conversion elements to generate the electric signals, while keeping the electric signals of the first image in said charge transfer stages, thereafter transferring the electric charges of the first image to the external via said vertical charge transfer paths, said horizontal charge transfer path and said output amplifier, and thereafter reading and transferring the electric charges of the second image to the external via said vertical charge transfer paths, said horizontal charge transfer path and said output amplifier; and synthesizing means for generating an image signal by subjecting the output electric signals of the first and second image to a white clip process and synthesizing the output electric signals.

12. A method of controlling an image pickup apparatus having a plurality of photoelectric conversion elements formed in a semiconductor substrate, each generating an electric signal through photoelectric conversion, a charge coupled device having a plurality of charge transfer stages adjacent to said photoelectric conversion elements in the semiconductor substrate and a plurality of gates for reading the electric signals generated by the photoelectric conversion elements to the charge transfer stages of the charge coupled device, the method comprising the steps of;

(a) performing a first image pickup operation by allowing a first image to be incident on the photoelectric conversion elements to generate the electric signals;

(b) reading the electric signals generated by the photoelectric conversion elements to the charge transfer stages adjacent to the photoelectric conversion elements, (c) performing a second image pickup operation under an image pickup condition different from the first image pickup operation by allowing a second image to be incident on the photoelectric conversion elements to generate the electric signals while keeping the electric signals of the first image in said charge transfer stages;

(d) transferring the electric signals of the first image in said charge coupled device, and outputting them to an external;

(e) reading the electric signals of the second image from the photoelectric conversion elements to the charge transfer stages and transferring the read electric signals in the charge coupled device;

(f) outputting the electric signals of the second image to the external; and (g) generating an image signal by subjecting the output electric signals of the first and second images to a white clip process and synthesizing the output electric signals, said steps (a) to (g) being executed in this order.

13. A method of controlling an image pickup apparatus according to claim 12, wherein the first image pickup operation is performed at a longer exposure time than the second image pickup operation.

14. A method of controlling an image pickup apparatus according to claim 12, wherein the first image pickup operation is performed at a shorter exposure time than the second image pickup operation.

15. A method of controlling an image pickup apparatus according to claim 12, wherein said step (c) makes the photoelectric conversion elements generate the electric signals under an image pickup condition different from the first image pickup operation by changing at least one of an exposure time, a subject illuminance, a transmittance of an optical system along an incidence light path to the photoelectric conversion elements, a stop, and the number of exposures.

16. A method of controlling an image pickup apparatus according to claim 12, wherein said step (c) makes the photoelectric conversion elements generate the electric signals under an image pickup condition different from the first image pickup operation by changing an exposure time of a mechanical shutter.

17. A method of controlling an image pickup apparatus according to claim 12, wherein said step (c) makes the photoelectric conversion elements generate the electric signals under an image pickup condition different from the first image pickup operations by changing a subject illuminance with an illumination device.

18. A method of controlling an image pickup apparatus according to claim 12, wherein said step (c) makes the photoelectric conversion elements generate the electric signals under an image pickup condition different from the first image pickup operation by changing a transmittance of an optical system along a light incidence path to the photoelectric conversion elements.

19. A method of controlling an image pickup apparatus having a plurality of photoelectric conversion elements formed in a semiconductor substrate, each generating an electric signal through photoelectric conversion, a charge coupled device having a plurality of charge transfer stages adjacent to said photoelectric conversion elements in the semiconductor substrate and a plurality of gates for reading the electric signals generated by the photoelectric conversion elements to the charge transfer stages of the charge coupled device, the method comprising the steps of;

when a still image is picked up, (A) performing a first image pickup operation by allowing a first image to be incident on the photoelectric conversion elements to generate the electric signals;

(B) reading the electric signals generated by the photoelectric conversion element to the charge transfer stages adjacent to the photoelectric conversion elements, (C) transferring the electric signals of the first image in said charge coupled device, and outputting them to an external;

(D) performing a second image pickup operation under an image pickup condition different from the first image pickup operation by allowing a second image to be incident on the photoelectric conversion elements to generate the electric signals while keeping the electric signals of the first image in said charge transfer stages;

(E) reading the electric signals of the second image from the photoelectric conversion elements to the charge transfer stages and transferring the read electric signals in the charge coupled device;

(F) outputting the electric signals of the second image to the external; and (G) generating an image signal by subjecting the output electric signals of the first and second images to a white clip process and synthesizing the output electric signals, said steps (A) to (G) being executed in this order, and when a moving image is picked up, (a) performing a first image pickup operation by allowing a first image to be incident on the photoelectric conversion elements to generate the electric signals;

(b) reading the electric signals generated by the photoelectric conversion elements to the charge transfer stages adjacent to the photoelectric conversion elements, (c) performing a second image pickup operation under an image pickup condition different from the first image pickup operation by allowing a second image to be incident on the photoelectric conversion elements to generate the electric signals while keeping the electric signals of the first image in said charge transfer stages;

(d) transferring the electric signals of the first image in said charge coupled device, and outputting them to an external;

(e) reading the electric signals of the second image from the photoelectric conversion elements to the charge transfer stages and transferring the read electric signals in the charge coupled device;

(f) outputting the electric signals of the second image to the external; and (g) generating an image signal by subjecting the output electric signals of the first and second images to a white clip process and synthesizing the output electric signals, said steps (a) to (g) being executed in this order.

20. A method of controlling an image pickup apparatus having a plurality of photoelectric conversion elements disposed in a matrix shape in vertical and horizontal directions on a surface of a semiconductor substrate, a plurality of gates formed adjacent to the photoelectric conversion elements for reading electric charges stored in the photoelectric conversion elements, a plurality of vertical charge transfer paths each having a plurality of charge transfer stages in the vertical direction, the vertical charge transfer path reading electric charges stored in at least one or more of the photoelectric conversion elements via the gates, a horizontal charge transfer path connected to lower ends of the vertical charge transfer paths for transferring electric charges from the vertical charge transfer path in the horizontal direction, an output amplifier for outputting electric charges transferred from the horizontal charge transfer path to an external, the method comprising the steps of:

(a) performing a first image pickup operation by allowing a first image to be incident on the photoelectric conversion elements to generate the electric signals;

(b) transferring the generated electric signals to the charge transfer stages adjacent to the photoelectric conversion elements;

(c) performing a second image pickup operation under an image pickup condition different from the first image pickup operation by allowing a second image to be incident on the photoelectric conversion elements to generate the electric signals while keeping the electric signals of the first image in said charge transfer stages;

(d) transferring the electric signals of the first image to an external via the vertical charge transfer paths, the horizontal charge transfer path and the output amplifier;

(e) outputting the electric signals of the second image to the external via the vertical charge transfer paths, the horizontal charge transfer path and the output amplifier; and (f) generating an image signal by subjecting the output electric signals of the first and second images to a white clip process and synthesizing the output electric signals.

* * * * *

UNITED STATES PATENT AND TRADEMARK OFFICE
CERTIFICATE OF CORRECTION

PATENT NO. : 6,784,935 B1 Page 1 of 1
DATED : August 31, 2004
INVENTOR(S) : Uya et al.

It is certified that error appears in the above-identified patent and that said Letters Patent is hereby corrected as shown below:

<u>Title page,</u>
Item [30], Foreign Application Priority Data, should read as follows:

-- [30]     Foreign Application Priority Data

Nov. 4, 1998       (JP) ………………………... 10-31 3334 --

Signed and Sealed this

Ninth Day of November, 2004

JON W. DUDAS
*Director of the United States Patent and Trademark Office*